United States Patent [19]

Hansen Kaad et al.

[11] Patent Number: 4,880,598
[45] Date of Patent: Nov. 14, 1989

[54] METHOD FOR MANUFACTURING A TUBULAR COMPACT

[75] Inventors: Flemming Hansen Kaad; Ola Pettersson, both of Höganäs, Sweden

[73] Assignee: Cips KB, Höganäs, Sweden

[21] Appl. No.: 284,562

[22] Filed: Dec. 15, 1988

[30] Foreign Application Priority Data

Dec. 18, 1987 [SE] Sweden .............................. 8705053

[51] Int. Cl.$^4$ .............................................. G22F 7/00
[52] U.S. Cl. ........................................ 419/1; 264/101;
264/299; 264/310; 264/319; 419/2; 419/5;
419/8; 419/9; 419/38; 419/42; 419/60; 419/66;
419/68
[58] Field of Search ..................... 419/1, 2, 5, 8, 9, 38,
419/42, 60, 66, 68; 264/101, 299, 310, 319

[56] References Cited

U.S. PATENT DOCUMENTS

| | | | |
|---|---|---|---|
| RE. 32,389 | 4/1987 | Becker et al. | 419/8 |
| 4,477,955 | 10/1984 | Becker et al. | 419/8 |
| 4,537,167 | 8/1985 | Eudier et al. | 75/255 |
| 4,544,523 | 10/1985 | McCollough et al. | 419/8 |

Primary Examiner—Stephen J. Lechert, Jr.
Attorney, Agent, or Firm—Shapiro and Shapiro

[57] ABSTRACT

A tubular compact (14) obtained by compacting a powder is applied with one circumferential surface (16) at a minimum distance required for said application, from an abutment surface (15) corresponding to said one circumferential surface (16). The space between said one circumferential surface (16) and the abutment surface (15) is evacuated, such that the compact (14), while undergoing a certain deformation to bridge said space, is sucked against the abutment surface (15) so as to be firmly retained against it.

A device for carrying out the above comprises a support means (1) having an abutment surface (15) corresponding to one circumferential surface (16) of the compact (14), at least one opening (2) provided in the abutment surface (15) of the support means (1), and a channel which is provided in the support means (1) and which at one end communicates with the opening (2) and at the other end is connectible (11, 12) to a vacuum source (13), such that an evacuation, brought about by the vacuum source (13) through the channel and the opening (2), of the space between the abutment surface (15) and the compact (16) sucks the latter into a position of firm retention against the abutment surface (15).

11 Claims, 1 Drawing Sheet

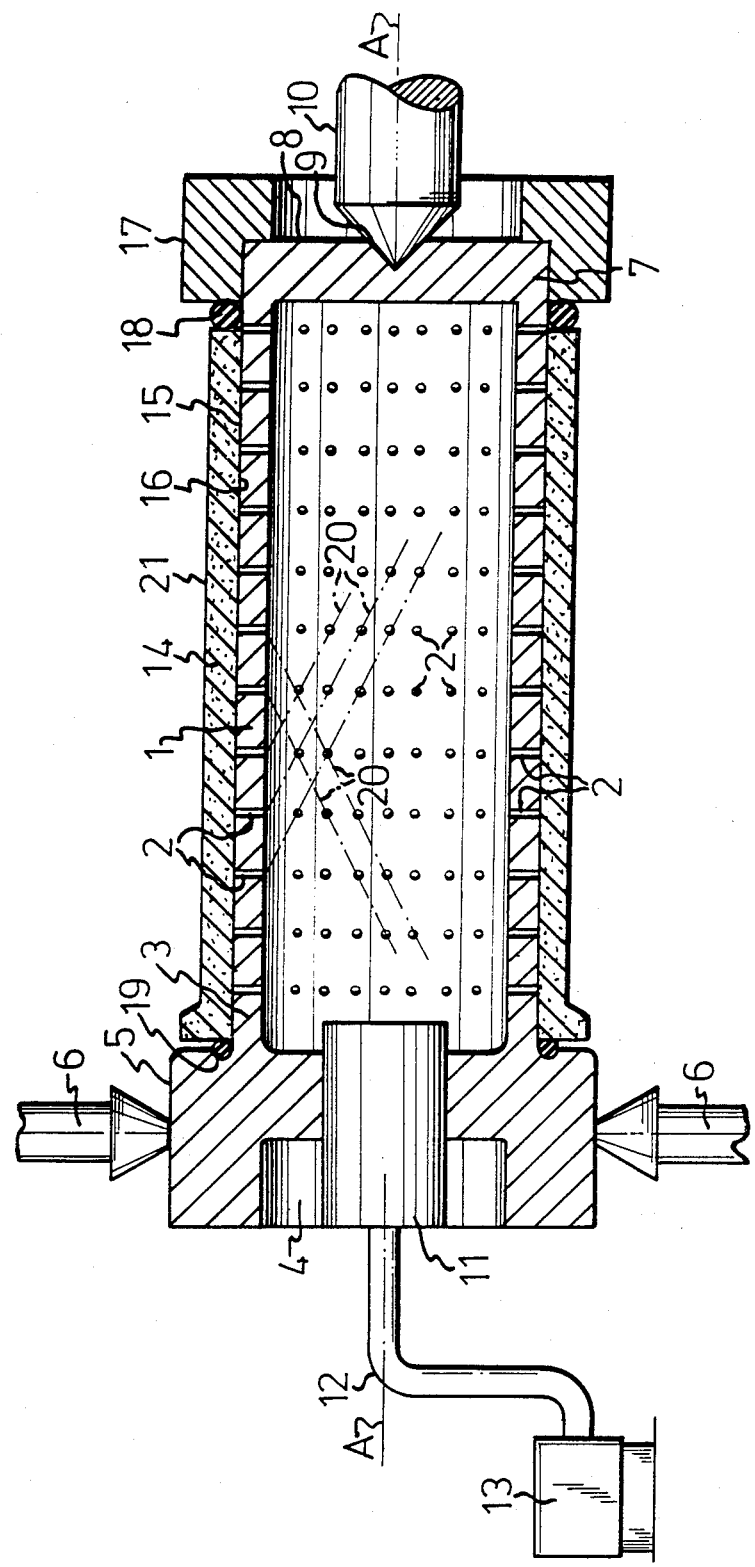

METHOD FOR MANUFACTURING A TUBULAR COMPACT

The present invention relates to a method for handling tubular compacts in connection with the manufacture thereof, and a device for carrying out the method.

The invention has been developed especially for use in connection with cold isostatic pressing of metal powder to form thin-walled, hollow cylindrical compacts, such as cylinder linings for internal combustion engines. It should however be emphasised from the very outset that the invention is also applicable both to other powder materials, for instance ceramic materials, which are compactible to give the required inherent strength, and to compacts of noncylindrical cross-section.

In the manufacture of such PM-linings (powder metal linings), an at least partially elastic moulding tool is first filled with metal powder and then closed and subjected to an isostatic pressure for compacting the powder into a so-called compact or "green body". Immediately after compaction, the resulting compact has a relatively low strength and, to obtain the desired final strength, it must be subjected to one or more subsequent heat treatment steps, such as soft annealing, presintering or sintering. The thus obtained sintered compact, which has a considerably higher strength than the solely compacted powder body, can then be handled and shaped without any risk of breaking or being damaged. For the above-mentioned PM-linings, such shaping typically comprises turning one or both circumferential surfaces of the lining, such that the circumferential wall of the lining can satisfy high demands on dimensional tolerances of the wall thickness.

For other compacts, such after-treatment may however include other operations than turning, for instance grinding, drilling etc.

One reason why such a surface treatment must be resorted to in the manufacture of PM-linings is that the elastomer used in the moulding tool wears and is deformed after some time of use, which in turn means undesired dimensional deviations in the lining. Another reason is that the demands placed on the dimensional tolerances are often so high that it is impossible, also with an entirely new, intact moulding tool, to produce linings of the desired tolerance without resorting to after-treatment of the lining, since the powder particles are pressed during compaction into the elastomer of the moulding tool and, after completed compaction, form undesired unevennesses in the surface of the compact.

One drawback of the known technique now described therefore is that the entire moulding tool or parts thereof must be replaced at regular intervals, which means substantial costs.

Another drawback of the known technique described above is that the tool used for processing wears very quickly because of the considerable hardness of the sintered compact. As an example hereof may be mentioned that when turning a sintered PM-lining having a length of about 200 mm, a diameter of about 100 mm and a wall thickness of about 2 mm, the cutting tool employed exhibited a wear of about 0.4 mm after 10 minutes' turning. Since the dimensional tolerance as regards the wall thickness of a finished PM-lining is in the order of a few hundredths of a millimeter, it is evident that such wear of the cutting tool means a substantial problem in this context.

In order to reduce the wear of the cutting tool, it has been suggested first to presinter the compact to a strength before surface processing that is acceptable in view of handling and shaping and then, after completed processing, to perform final sintering. This presintering technique however means an additional process step with a consequential cost increase and a prolonged time of manufacture. This technique, like the above-mentioned technique of surface processing after completed sintering, also is disadvantageous in so far as the material removed during processing cannot be reused in the process. It has been estimated, e.g. when manufacturing a PM-lining having the dimensions stated above, that the surface processing of ten sintered PM-linings involves the removal of such an amount of material as corresponds to approximately the amount of material required for making an entire lining.

Another drawback of the known technique of processing the compact in the sintered or presintered state is that the lining, which traditionally has an axial through slit in the circumferential wall, will exhibit a certain undesired skewness as a result of the surface processing.

An object of the present invention therefore is to offer a technique which overcomes the above-mentioned drawbacks, i.e. which largely prevents tool wear, allows reuse of material removed during processing, ensures an extended life of the moulding tool and thus larger dimensional tolerances in the compact, and which also overcomes the problem of skewness in slitted linings.

According to the invention, this object is achieved by a technique which makes it possible to handle and process the compact directly after compacting and before any additional strength-increasing processing step, such as sintering or presintering.

According to the invention, there are provided both a method for carrying out this technique and a device for carrying out the method.

The method according to the invention is characterised by applying one circumferential surface of the compact at a minimum distance required for said application, from an abutment surface corresponding to said one circumferential surface, and thereafter evacuating the space between said one circumferential surface and said abutment surface, such that the compact, while undergoing a certain deformation to bridge said distance, is sucked against the abutment surface so as to be firmly retained against it. The other circumferential surface of the compact thus retained is preferably made accessible to processing, for instance turning.

One essential feature of the inventive method resides in using the deformability of the compact in a state directly after compacting or in a state in which the strength of the compact has been increased but to a relatively small extent, e.g. by a certain degree of heating, in order to ensure retention of the compact against the abutment surface. At present, it seems however preferable to apply and suck fast the compact to the abutment surface directly after compacting, such that the powder removed during subsequent processing can be reused in the manufacturing process.

The inventive method further yields the advantage of permitting larger dimensional tolerances for the "green body" since subsequent processing of the body to desired tolerances does not involve any of the above-mentioned problems inherent in the prior art technique.

Another advantage of the inventive method is that processing can be carried out considerably faster than the processing of sintered bodies having high hardness.

For carrying out the inventive method, there is further provided according to the invention a device by means of which tubular compacts can be handled without any risk of breaking. Such a device is characterised by support means having an abutment surface corresponding, to one circumferential surface of the compact, at least one opening provided in the abutment surface of the support means, and a channel which is provided in the support means and which at one end communicates with said opening and at the other end is connectible to a vacuum source, such that an evacuation, brought about by the vacuum source through said channel and said opening, of the space between the abutment surface and the compact causes the latter to be sucked into a position of firm retention against the abutment surface. The abutment surface of the support means then is preferably so dimensioned that the compact can be applied thereto with a minimum distance required for said application between the abutment surface and said one circumferential surface of the compact.

Other features of the invention will appear from the appended claims.

The invention will now be described in more detail hereinbelow in one embodiment thereof with reference to the accompanying drawing showing a device for retaining a PM-lining at the inner cylindrical circumferential surface thereof.

The device shown in the drawing comprises a support means in the form of an elongate hollow supporting cylinder 1 the circumferential wall of which is provided with a large number of evenly distributed through openings 2. At one end 3, the cylinder 1 is connected to a first end wall 4 having a peripheral gripping surface 5 for engagement with turning centres 6. At its other end 7, the cylinder 1 is closed by a second end wall 8 having a central conical recess 9 for receiving a supporting centre 10.

The device further comprises a swivel pipe 11 centrally disposed in the first end wall 4 and connected by a connection 12 to a vacuum pump 13.

In the illustrated embodiment, an isostatically compacted cylindrical PM-lining 14—a so-called "green body"—is applied on the cylinder 1 with a minimum distance required for this application between an outer cylindrical abutment surface 15 of the supporting cylinder 1 and the inner cylindrical circumferential surface 16 of the PM-lining 14. After application of the PM-lining 14, a sealing end wall 17 has been mounted on the other end 7 of the cylinder 1 to sealingly engage the corresponding end of the lining 14 by the intermediary of an O-ring 18. A similar O-ring 19 is provided at the opposite end of the lining in order, together with the O-ring 18, to seal the space between the lining 14 and the cylinder 1.

In the FIGURE, the dash-dot lines schematically show oblique distributing grooves 20 which are provided in the outer abutment surface 15 of the cylinder 1 and extend between the openings 2. The grooves 20 serve to distribute the suction forces produced when using the invention. The use and the mode of operation of the device described above will now be illustrated in some Examples which clearly show the advantages of the invention as compared with the prior art.

EXAMPLE 1

In a test, it was desired to work or process a PM-lining having a diameter of the order of 100 mm, a length of the order of 200 mm and a wall thickness of the order of 2 mm. The compact was manufactured from a mixture of iron powder with an addition of ferrophosphorous powder (3% by weight) and graphite powder (1.9% by weight) and had been subjected to cold isostatic pressing at a pressure of 400 MPa. The clearance between the abutment surface 15 of the cylinder 1 and the inner circumferential surface 16 of the lining 14 initially was 0.05 mm around the entire periphery of the cylinder. Before starting processing the outer circumferential surface 21 of the lining, there was a variation of the thickness of the outer circumferential wall 21 of the lining 14 of about 0.4 mm.

After the pressed, unsintered lining 14 had been placed on the cylinder 1, the sealing end wall 17 was mounted for sealing the space between the lining 14 and the cylinder 1. The vacuum pump 13 was thereafter started for evacuating said space via the connection 12, the swivel pipe 11, the interior of the cylinder 1 and the openings 2. The depression in the openings 2 was measured at about 0.95 bar. As a result hereof, the lining 14, while undergoing a certain deformation to bridge said clearance of 0.05 mm, was sucked fast to the abutment surface 15 of the cylinder 1. The outer circumferential surface 21 of the lining 14 now retained was thereafter processed at a speed of the cylinder 1 and the lining 14 of 900 rpm and with a feed of 0.3 mm per revolution. After completed turning, the variation of the wall thickness was measured at about 0.05 mm, which satisfies the dimensional tolerances set. After completed processing, the lining 14 was released from the cylinder 1 and subjected to sintering to obtain the desired strength.

EXAMPLE 2

In order to study the wear of the cutting edge, a test was performed in which a carbide tip processed a distance of 65 km and cut more than 42 kg of powder material from unsintered PM-linings 14. After completed turning, no measurable wear of the cutting edge could be observed (the wear was less than 0.01 mm).

EXAMPLE 3

In order to assess the importance of the size of the distance or clearance between the inner circumferential surface 16 of the PM-lining 14 and the abutment surface 15 of the cylinder 1, a test was performed using a lining having an outer diameter of 108.6 mm, an inner diameter of 104.1 mm and a wall thickness variation of about 0.4 mm. The diameter of the abutment surface 15 of the cylinder 1 was 104 mm. There were provided 32 evenly distributed openings, each having a diameter of 2 mm. The depression was 0.95 bar. During turning, the speed was 900 rpm and the feed 0.3 mm per revolution. After turning, no relative torsion could be observed. A new test was thereafter performed with unaltered parameters, with the exception of the inner diameter of the PM-lining 14 which was now instead 104.3 mm, i.e. the clearance was increased to 0.15 mm. In this new test, a relative torsion between the lining 14 and the cylinder 1 was observed after completed turning. This torsion was due to the tangential components of the cutting forces having exceeded the friction and suction forces between the inner circumferential surface 16 and the abutment surface 15.

EXAMPLE 4

To assess the importance of the dimensions of the openings 2, a test was performed corresponding to the tests in Examples 1 and 3, but using only 10 openings, each having a diameter of 5 mm. After turning, a slight relative torsion was observed as well as residual deformations in the inner circumferential surface 16 of the lining 14 at the points where said surface had abutted the openings 2.

For a cylinder lining 14 having the dimensions stated above, it appears from the above Examples, that the clearance between the inner circumferential surface 16 of the PM-lining 14 and the outer abutment surface 15 of the cylinder 1 should be 0.1 mm or less, preferably in the order of 0.05 mm. It further appears that the diameter of the openings 2 should be less than 5 mm, preferably less than 2 mm. Further, it has been established that the distributing grooves 20 formed in the abutment surface 15 and extending between the openings 2 positively assist in obtaining a more uniform retention of the lining 14 and also positively increase the friction between the lining 14 and the cylinder 1.

It should be pointed out in particular that the embodiment shown in the FIGURE and the values stated in Examples 1–4 have been given for exemplifying purposes only and must not in any way be considered limitative of the invention such as it is defined in the accompanying claims.

For example, the invention is not restricted to metal powder, isostatic pressing or hollow cylindrical compacts. Thus, the technique is also applicable e.g. to ceramic powders and compacts other than that shown in the FIGURE.

Further, the retention of the compact can also be performed at its outer circumferential surface if, for example, it is desirable to work its inner circumferential surface, in which case the support means may instead be designed as a sleeve in which the compact can be inserted with a slight clearance between the outer circumferential surface of the compact and the inner circumferential surface of the sleeve.

To conclude, it should also be mentioned that it has been suggested to use a porous material for the entire abutment surface 15, instead of using the openings 2 in an otherwise hard, impermeable abutment surface. In particular, it has been proposed to manufacture the entire supporting cylinder 1 from a sintered porous PM-material which typically has a porosity of about 10–15%, or any other suitable ceramic material.

It is claimed:

1. A method of handling a tubular compact formed by compacting a powder into a tubular shape, comprising the steps of fitting a circumferential surface of the compact to a complementary abutment surface with a slight clearance space therebetween, and evacuating said clearance space such that the compact bridges said space and is drawn into firm retention against said abutment surface.

2. The method of claim 1, wherein the aforesaid steps are conducted prior to subjecting the compact to a final strength-increasing heat treatment.

3. The method of claim 1, wherein said abutment surface is air pervious and said evacuating step comprises applying a vacuum to said clearance space through said abutment surface.

4. The method of claim 1, wherein said abutment surface is air permeable.

5. The method of claim 1, wherein another circumferential surface of the compact is held accessible to working during said retention of the compact against said abutment surface.

6. The method of claim 5, further comprising the step of rotating said abutment surface, with the compact retained thereon, for rotary working of said other circumferential surface of the compact.

7. A method of handling a tubular compact formed by compacting a powder into a tubular shape, comprising the steps of providing a supporting means including an air pervious abutment surface complementary to a circumferential surface of the compact, fitting said circumferential surface of the compact to said abutment surface with a slight clearance space therebetween, connecting said supporting means to a vacuum source, and applying a vacuum through said abutment surface to evacuate said clearance space and draw said circumferential surface of the compact into firm retention against said abutment surface.

8. The method of claim 7, further comprising the step of sealing axial ends of said clearance space with corresponding annular sealing members sealingly engaged with said abutment surface and respective axial ends of the compact.

9. The method of claim 7, wherein said abutment surface has openings therethrough and vacuum distributing grooves in communication with said the openings.

10. The method of claim 7, wherein said abutment surface is air permeable.

11. The method of claim 7, further comprising the steps of rotating said abutment surface and working another circumferential surface of the compact with the compact retained against said abutment surface as aforesaid.

* * * * *